US008631896B2

(12) United States Patent
Markfort et al.

(10) Patent No.: US 8,631,896 B2
(45) Date of Patent: Jan. 21, 2014

(54) STEERING WHEEL FOR A MOTOR VEHICLE HAVING SUPERIMPOSED STEERING

(75) Inventors: Dieter Markfort, Berlin (DE); Philipp Werdin, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 39 days.

(21) Appl. No.: 13/259,121

(22) PCT Filed: Mar. 23, 2010

(86) PCT No.: PCT/EP2010/053775
§ 371 (c)(1),
(2), (4) Date: Sep. 22, 2011

(87) PCT Pub. No.: WO2010/115707
PCT Pub. Date: Oct. 14, 2010

(65) Prior Publication Data
US 2012/0024617 A1     Feb. 2, 2012

(30) Foreign Application Priority Data
Apr. 9, 2009   (DE) .......................... 10 2009 017 714

(51) Int. Cl.
*B62D 1/04* (2006.01)
(52) U.S. Cl.
USPC ............................ 180/444; 180/443; 180/446
(58) Field of Classification Search
USPC ......................................... 180/443, 444, 446
See application file for complete search history.

(56) References Cited

U.S. PATENT DOCUMENTS 5,984,042 A     11/1999 Nishimoto et al.
6,053,270 A *    4/2000 Nishikawa et al. ........... 180/168
(Continued)

FOREIGN PATENT DOCUMENTS

CN     1767975 A     5/2006
CN     1867477 A    11/2006
(Continued)

OTHER PUBLICATIONS

International Preliminary Report on Patentability (Chapter I of the Patent Cooperation Treaty) from the International Bureau of WIPO for International Application No. PCT/EP2010/053775 dated Oct. 18, 2011, 10 pages.

(Continued)

*Primary Examiner* — Kevin Hurley
*Assistant Examiner* — Michael Stabley
(74) *Attorney, Agent, or Firm* — Fitch, Even, Tabin & Flannery, LLP

(57) ABSTRACT

A steering wheel for a motor vehicle is provided. The steering wheel includes a steering wheel rim for rotating actuation of the steering wheel, a steering wheel hub for connecting the steering wheel with a steering shaft of a motor vehicle and a superposition drive for the actuation of a superposition steering by means of which said steering a steering angle created by actuation of the steering wheel rim can be superposed by a superposed angle that can be created by the superposition steering so that a respective rotation movement of a steering shaft connected with the steering wheel is composed of a steering angle that can be created by actuation of the steering wheel rim and a superposed angle that can be created by actuation of the superposition steering. An arresting appliance is provided on the steering wheel, separate from the components of the superposition steering for creating the superposed angle.

20 Claims, 6 Drawing Sheets

(56) References Cited

U.S. PATENT DOCUMENTS

| | | | |
|---|---|---|---|
| 7,243,570 B2 | 7/2007 | Kuehnhoefer et al. | |
| 8,002,075 B2 | 8/2011 | Markfort | |
| 8,230,964 B2* | 7/2012 | Markfort | 180/444 |
| 2006/0042861 A1* | 3/2006 | Ovshinsky | 180/443 |
| 2006/0162991 A1 | 7/2006 | Kuehnhoefer et al. | |
| 2008/0141814 A1 | 6/2008 | Markfort | |
| 2010/0004823 A1 | 1/2010 | Nakatsu | |
| 2011/0056762 A1* | 3/2011 | Markfort | 180/444 |
| 2011/0098887 A1* | 4/2011 | Fujimoto | 701/41 |

FOREIGN PATENT DOCUMENTS

| | | |
|---|---|---|
| CN | 10118508 A | 6/2008 |
| DE | 197 27 856 A1 | 1/1999 |
| DE | 101 60 313 A1 | 3/2003 |
| DE | 103 15 150 A1 | 10/2004 |
| DE | 10 2005 034 636 B3 | 3/2007 |
| DE | 10 2005 058 176 A1 | 6/2007 |
| DE | 10 2006 055 774 A1 | 5/2008 |
| DE | 10 2007 000 594 A1 | 5/2009 |
| EP | 1 382 792 A2 | 1/2004 |
| JP | H06-336163 A | 12/1994 |
| JP | H09-226605 A | 9/1997 |
| JP | 2002-249062 A | 9/2002 |
| JP | 2004-182061 A | 7/2004 |
| JP | 2006-521957 A | 9/2006 |
| WO | 2007/009420 A1 | 1/2007 |
| WO | 2008/125944 A1 | 10/2008 |
| WO | 2009/138462 A1 | 11/2009 |

OTHER PUBLICATIONS

International Search Report from the International Bureau of WIPO for International Application No. PCT/EP2010/053775 dated Jul. 20, 2010 (3 pages) and an English translation of the same (3 pages).
Partial English translation of Office Action issued in counterpart Japanese Application No. 2012-503950 dated Jun. 20, 2013 (1 page).
English translation of Notification of Office Action issued in counterpart Chinese Application No. 201080003287.3 dated Aug. 9, 2013 (9 pages).

* cited by examiner

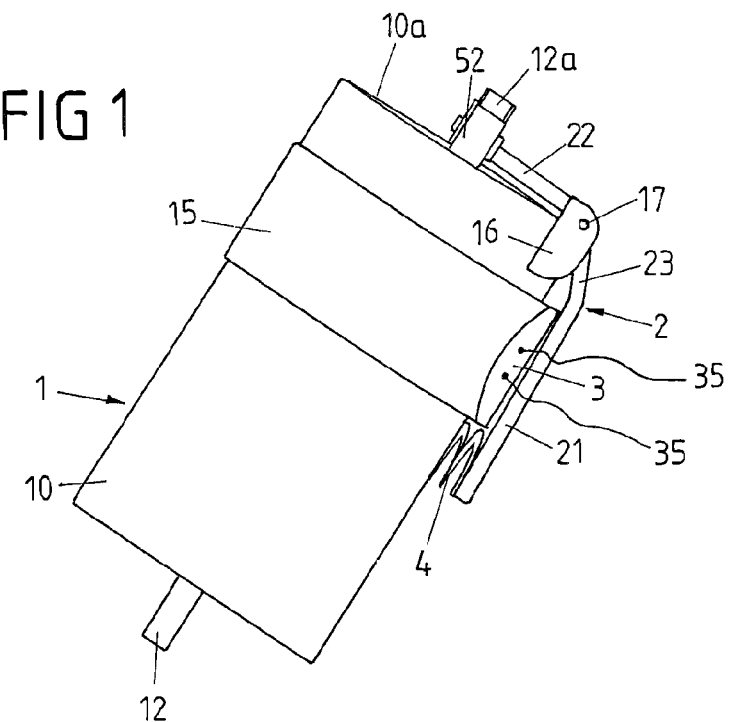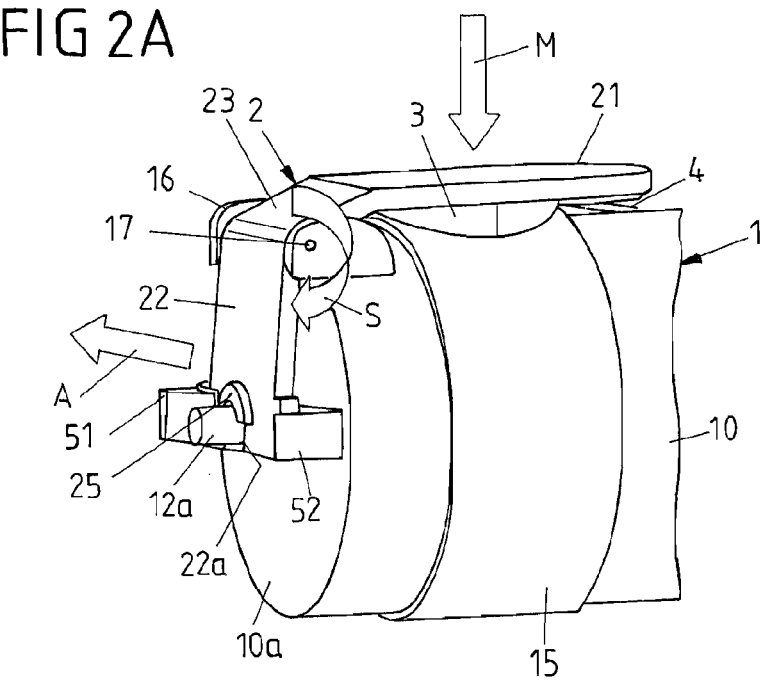

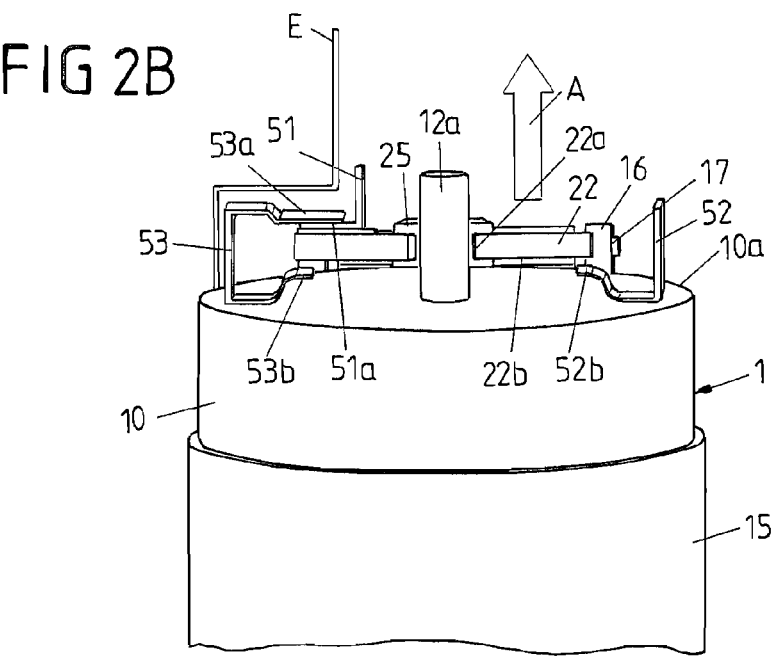
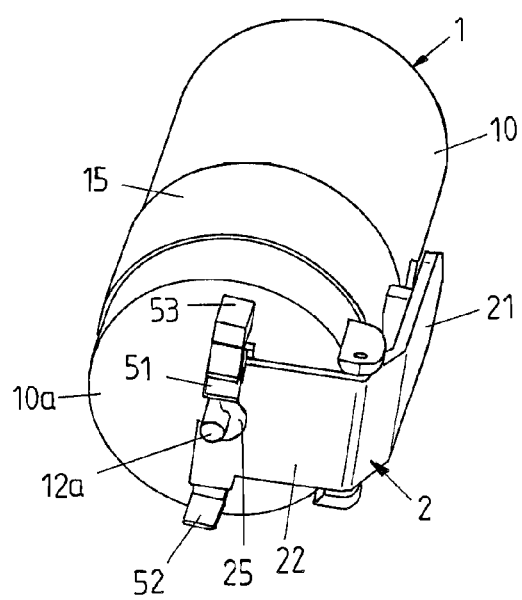

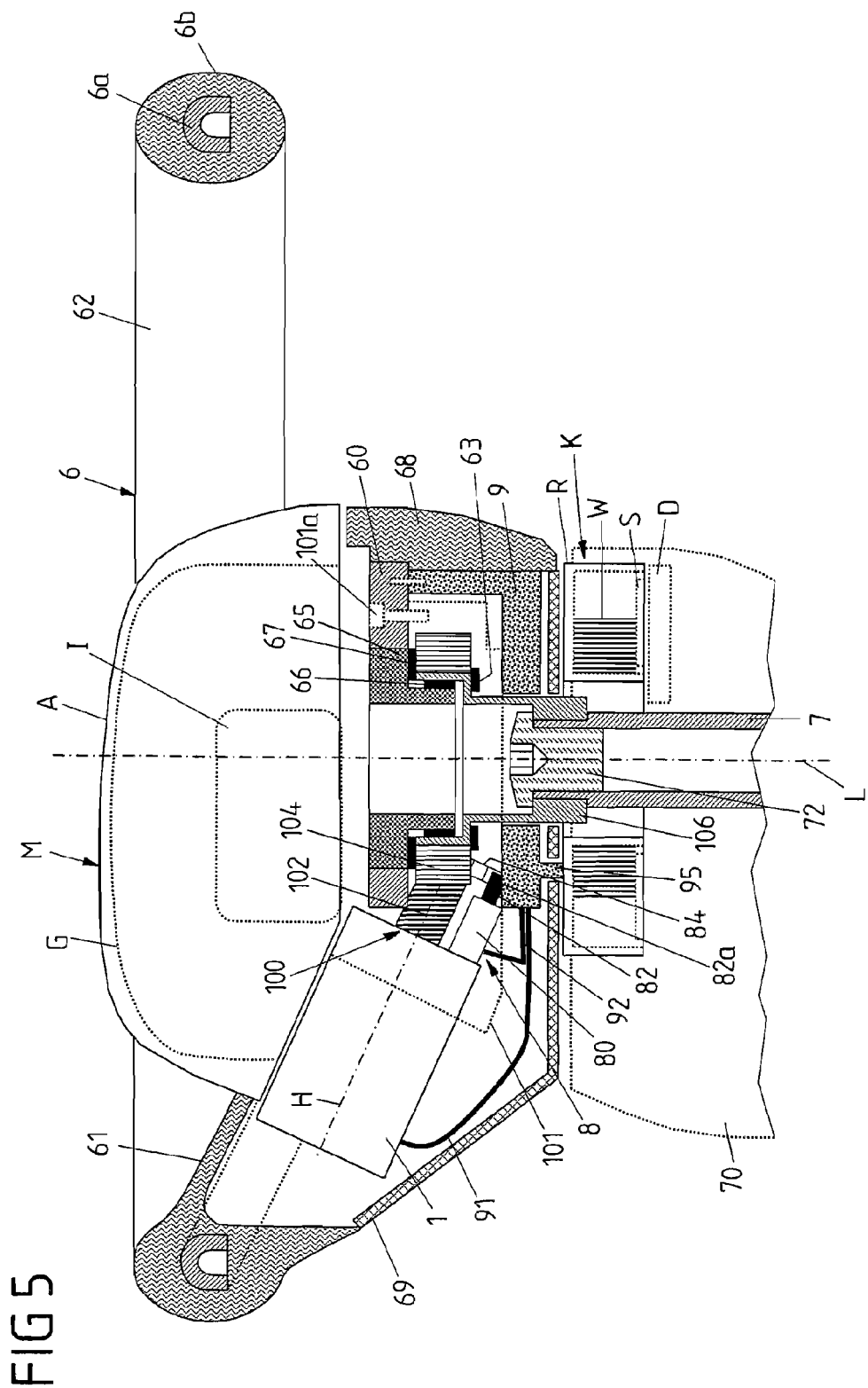

STEERING WHEEL FOR A MOTOR VEHICLE HAVING SUPERIMPOSED STEERING

CROSS-REFERENCE TO A RELATED APPLICATION

This application is a National Phase Patent Application of International Patent Application Number PCT/EP2010/053775, filed on Mar. 23, 2010, which claims priority of German Patent Application Number 10 2009 017 714.0, filed on Apr. 9, 2009.

BACKGROUND

The invention relates to a steering wheel for a motor vehicle according to the preamble of Patent claim 1.

Such a steering wheel comprises a steering wheel rim for rotating actuation of the steering wheel by a driver as well as a steering wheel hub via which the steering wheel can be connected with a steering shaft, which is separate from the steering wheel and can be rotated, so that a rotation movement of the steering wheel rim is converted into a corresponding rotation movement of the steering shaft. The steering wheel rim and the steering wheel hub are connected here, e.g. via spokes.

Furthermore, a superposition drive is provided on the steering wheel for the actuation of a superposition steering by means of which said steering a steering angle created by a driver's actuation of the steering wheel rim can be superposed by a superposed angle created by the superposition steering, so that a respective rotation movement of the steering shaft—referring to the state of the steering shaft in which it is connected with the steering wheel—is composed of a steering angle created by a driver's actuation of the steering wheel rim and a superposed angle created by actuation of the superposition steering, wherein the latter angle makes no contribution in case of a deactivation of the superposition steering.

Such a steering wheel is familiar from WO 2007/009420 A1. Herein, the superposition drive comprises two drive motors (electric motors), each one integrated into one spoke of the steering wheel respectively, which said motors can, each one via one worm respectively, act upon a central gear element of the superposition drive in the form of a worm gear on the output drive side. Via this gear element on the output drive side the superposition drive in turn stands in connection with an allocated steering shaft of a motor vehicle in such a way that a moment created by the drive motor of the superposition drive can be conveyed into the steering shaft to rotate said shaft on a specific superposed angle—in addition to a steering angle created by a driver's actuation of the steering wheel rim.

A further variant of a superposition drive for a superposition steering with a drive motor and a gearing subordinate to the drive motor is familiar from DE 101 60 313 A1, wherein this superposition drive is located outside of the steering wheel between a steering shaft portion on the input side that is connected with the steering wheel and a steering shaft portion on the output side that is connected with the steering gear of a motor vehicle. For this reason, additional installation space is needed in the area of the steering column surrounding the steering shaft for the housing of the superposition steering, which requires a corresponding configuration of the steering column.

SUMMARY

The problem underlying the invention is to develop a steering wheel for a vehicle with a superposition steering, which said steering does not require any additional installation space in the steering column and which can be arrested reliably upon deactivation.

According to an exemplary embodiment of the invention, a mechanical arresting appliance is provided on the steering wheel, separate from the components of the superposition steering for creating the superposed angle, by means of which said appliance the superposition drive can be arrested by mechanical action.

According to the exemplary embodiment of the invention the arresting appliance is a device that is separate from the components of the superposition drive which serve for creating the transmission angle; that is, such an arresting appliance cannot consist of a self-locking configuration of the superposition drive. The arresting appliance can rather be applied independently of whether the superposition drive is a self-locking or a non-self-locking drive.

The arresting appliance can here be activated (for instance electrically, say by means of an electromagnet, a drive motor or a relay, or also pneumatically), such that upon an activation of the arresting appliance the mechanical action of the arresting appliance upon the superposition drive is initiated and said drive hereby arrested. An activation of the arresting appliance in this case therefore (particularly as direct consequence) provokes an arresting of the superposition drive.

The arresting appliance can be deliberately be designed in a way that ensures an optimal retaining action upon arresting the superposition drive. On the other hand, the superposition drive can be optimized with regard to its actual drive function, particularly also its efficiency.

The superposition drive can consist of an actuator, e.g. in the form of a drive motor, and a superposition gearing subordinate to the actuator, via which said superposition gearing a drive torque created by the actuator is converted into a defined steering angle of an allocated steering shaft.

For the mechanical, particularly positive and/or force-fit locking, arresting or locking of the superposition drive the arresting appliance can comprise at least one holding element which in a holding position can be brought into positive and/or force-fit locking engagement with a component of the superposition drive to block said component and to hereby arrest or to lock the superposition drive. The holding element can for this purpose for instance be movable back and forth between a release position in which said element does not arrest or lock the superposition drive and that said holding position.

The holding element can possess fixing means, for example in the form of at least one jamming element or in the form of positive locking means, for the (jamming or positive locking) fixing or blocking of a component of the superposition drive.

The holding element, of which there is at least one, can basically act on any one of the components of the superposition drive to prevent a relative movement between the input side and the output side of the superposition drive and to hereby arrest or to lock the latter. In the locked state of the superposition drive a steering angle (namely a rotation movement of the steering shaft) can be created solely by a torque, which is conveyed by the driver's actuation of the steering wheel rim. In particular, the holding element can act on a drive shaft of the actuator (motor shaft) of the superposition drive, that is advantageously on a free end of this shaft, which said shaft to this end projects out of the casing of the actuator (motor casing) with an arresting portion. This arresting portion of the drive shaft is preferably turned away from that shaft portion via which the drive shaft acts upon a subordinate superposition gearing. Alternatively, however, the holding element can e.g. also act on an element connected with the drive shaft, as for example a drive worm, which constitutes a part of the superposition gearing.

To move the holding element back and forth between a release position and a holding position (and thus deactivate and activate the arresting appliance) for instance an electromagnet and/or spring means can be provided as movement-creating device, particularly also a combination of two such elements. In this way, upon activating (energizing) the electromagnet a magnetic force can be exerted onto the holding element, which for this purpose is made of a magnetic material or is furnished with a magnetic component, said force holding the holding element under restraint of the spring means in one of the said positions, namely the release position or the holding position. Upon non-energization of the electromagnet the holding element can then, under the effect of the spring elements, be transferred into the other one of the two positions respectively.

Exemplary, it can be provided that in the activated (energized) state of the electromagnet—counteracting the spring means—the holding element can be held in the release position and can, upon deactivation (non-energization) of the electromagnet relieving the spring means, be transferred into the holding position.

Further, an actuator in the form of a drive motor (particularly a linear motor) or in the form of a relay can be provided for moving the holding element between a release position and a holding position which transfers the holding element alternatively into its release position or its holding position. Preferably the holding element is here positioned in its release position when the actuator of the arresting appliance is energized; by the same token in this embodiment the holding element is advantageously positioned in its holding position when the actuator is not energized.

When the holding element is positioned in its release position, it should be located so that it does not act upon the superposition drive, particularly not influencing the torque transmission between input side and output side of the superposition drive. In this way a holding element, which in its holding position engages with the drive shaft of an actuator of the superposition steering, in its release position is advantageously spaced apart from the drive shaft, such that the rotation movement of the drive shaft is not influenced.

To change from a running operation of the superposition drive into its arrested or locked state, prior to or upon activation of the arresting appliance the power supply (energizing) for the actuator of the superposition drive can be interrupted and/or the actuator (at least two poles of the actuator) can be electrically short-circuited. In the latter case the actuator or superposition drive is decelerated by a short-circuit brake and is additionally arrested mechanically by the arresting appliance.

The holding element or a component of the movement-creating device allocated to the holding element can here, upon activation of the arresting appliance, serve to interrupt the current flow to the actuator and/or to short-circuit said actuator. For this purpose the holding element can act upon electric contacts of the actuator and/or itself possess electric contacts, which contribute to the fact that upon moving the holding element to transfer said element from its release position into its holding position, the current flow to the actuator is interrupted and/or the actuator is short-circuited. In particular, a forced coupling between the arresting appliance and the means for deactivation of the actuator can consequently exist by interrupting the power supply or the current flow.

In concrete terms, the holding element or another component of the appertaining movement-creating device can serve to establish in the release position of the holding element an electrical contact between the actuator and an allocated power supply/electronic control system of a motor vehicle and upon transfer of the holding element into the release position to interrupt that said electrical contacting and, on top of that, establish a short-circuit.

On the other hand, the means for deactivation of the superposition drive or the appertaining actuator (interrupt mechanism) can also act independently of the arresting appliance. The deactivation of the superposition drive or specifically of the actuator can in this case for example take place by means of a control unit via which the superposition drive/actuator is supplied with electric current and/or control signals.

The holding element itself can be designed pivotable and/or slidable, such that it can be pivoted or shifted between a release position and a holding position.

According to one exemplary embodiment the holding element can consist of a two-armed (angled) lever, one lever arm of which is allocated to the movement-creating device, to move the holding element back and forth between a release position and a holding position, and the second lever arm of which is provided for a blocking engagement with a component of the superposition drive when the holding element is positioned in the holding position.

According to another exemplary embodiment the holding element can be a locking bolt which can, by suitable actuating means, for example by an actuator of the arresting appliance, be brought into positive and/or force-fit locking engagement with a subordinate element, for example a locking plate which is provided on a component of the superposition drive, to lock said drive.

According to a development of the invention at the least parts of the superposition drive, as for example the superposition gearing and/or a control unit allocated to the superposition drive, are located behind the steering wheel hub. This means that the aforementioned assemblies are covered by the steering wheel hub when the steering wheel is duly installed into a motor vehicle and viewed from the due seat of the vehicle operator (driver) who has to actuate the steering wheel.

Furthermore, it can advantageously be provided that the actuator of the superposition drive with its drive shaft (motor shaft) or the hereby defined driving axle is spatially adjusted such that it extends angularly inclined (at an angle of less than 90°) to the steering shaft, particularly with an inclination corresponding with the inclination of the steering wheel spokes relating to the steering shaft. Hereby, the actuator can, in a visually appealing manner, be aggregated to an installation unit with a steering wheel spoke.

According to a further exemplary embodiment, a combination of a short-circuit brake and a mechanical arresting appliance for a superposition drive of a superposition steering can also be employed outside of a steering wheel advantageously in a steering system, e.g. between a steering wheel and a subordinate steering shaft or between two shaft portions of the steering shaft.

BRIEF DESCRIPTION OF THE DRAWINGS

Further details and advantages of the invention will become clear in the subsequent specification of exemplary embodiments on the basis of the Figures.

FIG. 1 shows a side view of an actuator of a superposition steering for the steering wheel of a motor vehicle with an arresting appliance for arresting the actuator.

FIG. 2A shows a first perspective illustration of a section of the actuator from FIG. 1 with deactivated arresting appliance so that the actuator can drive a superposition steering.

FIG. 2B shows a second perspective illustration of the layout according to FIG. 2A.

FIG. 2C shows a third perspective illustration of the layout according to FIG. 2A.

FIG. 5 shows a modification of the exemplary embodiment from FIGS. 1 to 4, illustrated with the help of a sectional view of a steering wheel.

DETAILED DESCRIPTION

Figure 3A:
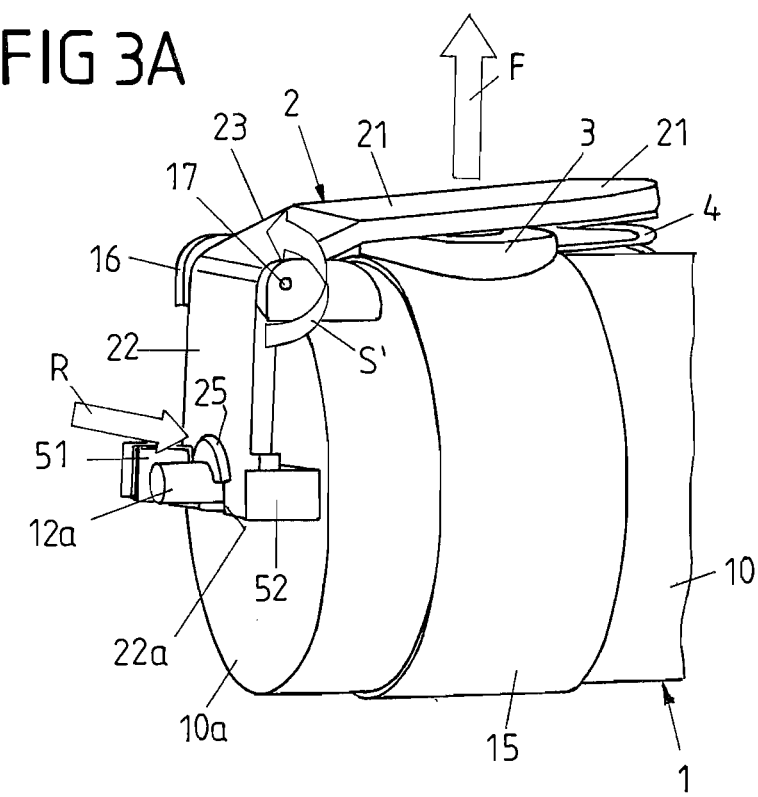
FIG. 3A shows a first perspective illustration of a section of the actuator from FIG. 1 in the activated state of the arresting appliance so that the actuator is arrested.

FIG. 1 shows a side view of an actuator 1 of a superposition steering, in this case designed as a drive motor (electric motor) to drive a superposition gearing subordinate to the actuator 1, by means of which said gearing a steering angle created by actuating a steering wheel can be superposed by an additional angle (superposed angle).

The actuator 1 comprises a casing 10 (motor casing), out of which a drive shaft 12 (actuator or motor shaft) projects in familiar manner, which said shaft is rotated during the operation of the actuator 1 and which interacts with a subordinate superposition gearing to transmit a drive torque created by the actuator 1 onto the superposition gearing.

Presently, the drive shaft 12 projects out of the (pipe-shaped) casing 10 of the actuator 1 not only in the usual manner, axially with a shaft portion on its free end to allow it to be coupled torque-transmitting with a subordinate superposition gearing, but the drive shaft 12, on top of that, also projects out of the casing 10 with its other, its second free end portion 12a on an axial front side 10a of this said casing 10. This second end portion 12a of the drive shaft 12 will subsequently be designated as arresting portion 12a of the drive shaft 12, because the actuator 1, as will be specified subsequently in detail, can be arrested or locked by mechanical action of an arresting appliance onto this said arresting portion 12a of the drive shaft 12.

In the exemplary embodiment the arresting appliance 2, 3, 4 has a holding element 2 in the form of an arresting lever with two lever arms 21, 22, standing at an angle (a right angle) towards each other and connected with each other via a connecting portion 23, as well as furthermore an electromagnet 3 with electric connectors 35 and spring means 4 as movement-creating device for actuating the holding element 2.

The holding element 2 is here mounted pivotably around a swivel axis 17 which is attached onto the casing 10 of the actuator 1 by means of holding fixtures 16. The electromagnet 3 and the spring means 4 are likewise located on the casing 10, that is the electromagnet 3 on a holding ring 15 encompassing the casing 10 and the spring means 4 on a portion of the casing wall, so that they are housed between the first level arm 21 of the holding element 2 and the casing 10.

Figure 3B:
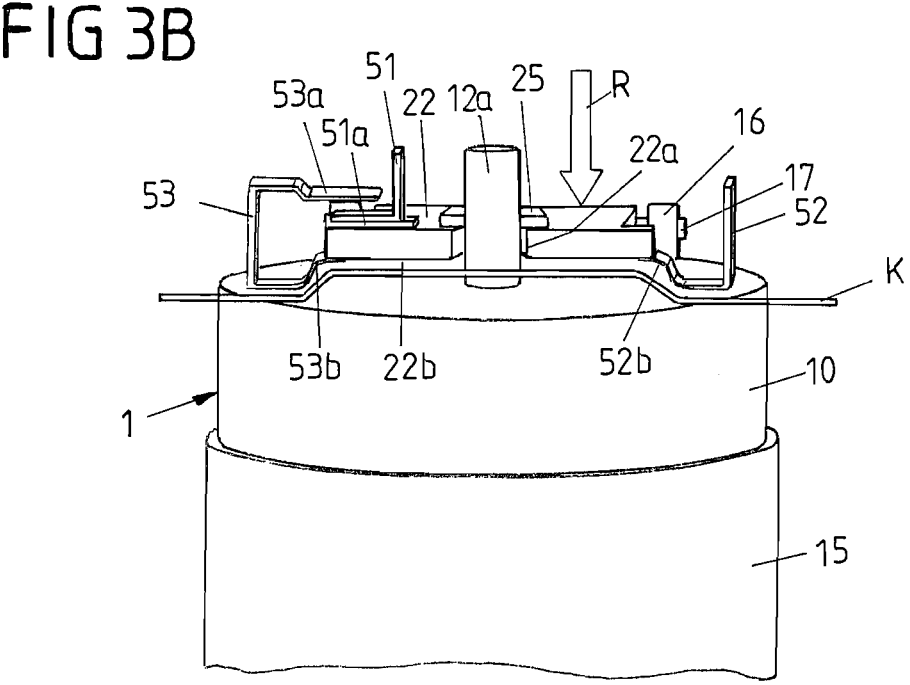
FIG. 3B shows a second perspective illustration according to FIG. 3A.
Figure 3C:
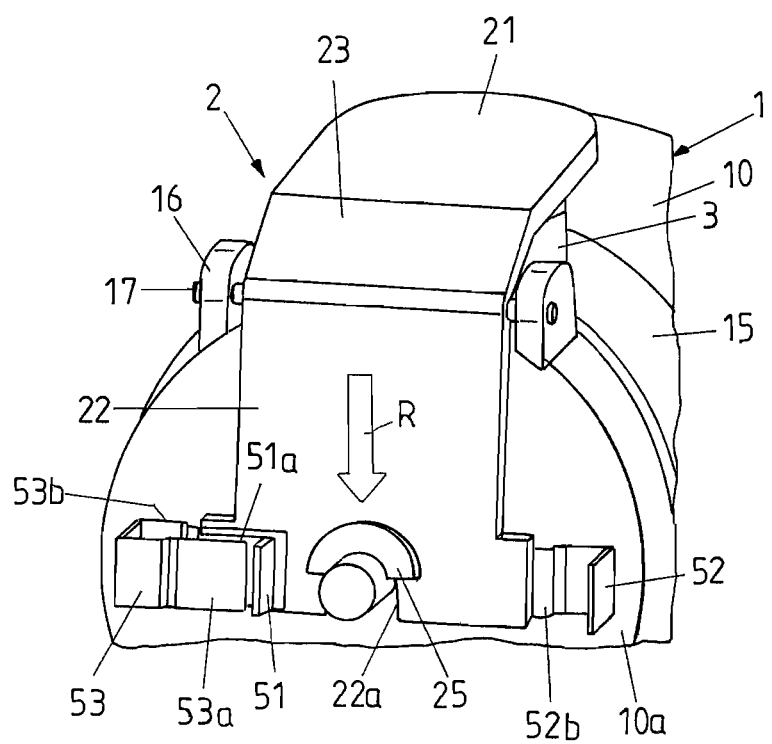
FIG. 3C shows a third perspective illustration according to FIG. 3A.

The structure of the arresting appliance 2, 3, 4 as well as its function will subsequently be explained in greater detail with the help of a combined consideration of FIG. 1 with FIGS. 2A to 2C and with FIGS. 3A to 3C, wherein FIGS. 2A to 2C show the non-arrested actuator 1 and FIGS. 3A to 3C show the actuator 1 being arrested by means of the arresting appliance 2, 3, 4.

According to a combined consideration of FIG. 1 with FIGS. 2A to 2C the first lever arm of the holding element 2, said lever arm being designed as arresting lever, serves as an actuating portion 21, via which a pivoting movement of the holding element 2 around its swivel axis 17 can be initiated, that is by interaction of said actuating portion 21 with the electromagnet 3 and the spring means 4.

In the state of the actuator 1 which is shown in FIGS. 2A to 2C the electromagnet 3 is active, i.e. energized, so that it exerts a magnetic holding force M on the actuating portion 21 of the holding element 2, which said force tends to bring the actuating portion 21 of the holding element 2 up against the electromagnet 3, as can be seen particularly in FIG. 2A. The actuating portion 21 of the holding element 2 is for this purpose made of a magnetic material, at the least in some areas.

The electromagnet 3 and the actuating portion 21 of the holding element 2 are planned in 7 such a way that upon energizing the electromagnet 3 the magnetic holding force, acting upon the actuating portion 21, or the holding moment connected with it (relating to the swivel axis 17 of the holding element 2) is larger than the return force or the return moment which is exerted by the spring means 4 located between the casing 10 of the actuator 1 and the actuating portion 21 of the holding element 2, counteracting the electromagnet 3. The spring means 4 are herein in the exemplary embodiment designed as a pressure spring and under the effect of their pre-stress they tend to move the actuating portion 21 of the holding element 2 away from the electromagnet 3.

As a result, with the electromagnet 3 being energized, the magnetic holding forces M acting upon the actuating portion 21 of the holding element 2 are therefore sufficiently large enough for the holding element 2 to be pressed against said electromagnet 3 with its actuating portion 21. This corresponds with such a pivoting direction S of the holding element 2 around the allocated swivel axis 17 that the holding portion 22, interacting with the arresting portion 12a of the drive shaft 12, disengages along a direction A from said arresting portion 12a. I.e., the holding portion 22 of the holding element 2 in this state does not act upon the arresting portion 12a of the drive shaft 12 so that this said shaft 12 can be rotated freely.

As becomes clear with the help of FIG. 2B in particular, for energizing the actuator 1 two electric connectors 51, 52 are provided which are located in the area of the holding element 2, in the exemplary embodiment specifically in the area of the holding portion 22 of the holding element 2, and with that are located on that front side 10a of the casing 10 in front of which the holding portion 22 of the holding element 2 extends (said holding portion 22 having a wrap-around 22a which encloses the arresting portion 12a of the drive shaft 12 with a fixing element 25 located thereupon).

While the second electric connector 52 stands in immediate electrical contact with the actuator 1, the first electric connector 51 is electrically connected via a connection conductor element 53 with the actuator 1. For this purpose the first electric connector 51 is located on the holding element 2, that is to say on its holding portion 22, with an (angled) connector portion 51a, and, on top of that, stands in electrical connection with a contacting portion 53a of the connection conductor element 53 via the connector portion 51a, when the holding element 2 as well as its holding portion 22 in the state shown in FIGS. 2A to 2C (with energized electromagnet 3) are adjusted so that the holding portion 22 is not in engagement with the arresting portion 12a of the drive shaft 12. Hereby, an electric current flow is made possible along a power supply line E for the supply of the actuator 1, as schematically indicated in FIG. 2B.

Furthermore, both the connection conductor element 53 allocated to the first electric connector 51 and the second electric connector 52 each have a short-circuit portion 52b and 53b respectively, lying opposite to an electrically conductive surface 22b of the holding element 2 which is facing the motor casing 10 or its front side 10a on the side of the holding element; that is, in the state shown in FIGS. 2A to 2C, with a spacing so that there is no contact between those said short-circuit portions 52b, 53b and the electric surface 22b of the holding element 2 or of the holding portion 22 which lies opposite to them.

Based on the state of the arresting appliance 2, 3, 4 as shown in FIGS. 2A to 2C, with an active (energized) electromagnet 3 and correspondingly deactivated arresting device 2, 3, 4, the actuator 1 for actuating a superposition steering for the steering wheel of a motor vehicle can be operated as follows:

An electrical power (electric current) delivered to the actuator 1—from the electronic system of a motor vehicle or the power supply on the side of a motor vehicle—via the electric connectors 51, 52 provokes, according to the electromotive principle, a rotation of the drive shaft 12 of the actuator 1 so that via this a torque can be transmitted onto a superposition gearing subordinate to the actuator 1. Alternatively, the drive shaft 12 itself can be part of the superposition gearing. The end of the drive shaft 12 which lies opposite the arresting portion 12a is then e.g. furnished with a toothing, best constructed as worm shaft. The rotation movement of the drive shaft 12 is here not affected by the arresting appliance 2, 3, 4, because the holding element 2, specifically its holding portion 22, is disengaged from the arresting portion 12a of the drive shaft 12.

Here it can, divergent from the illustrated exemplary embodiment, also be provided to modify the interaction of holding element 2, electromagnet 3 and spring means 4 so that the state shown in FIGS. 2A to 2C is assumed upon non-energized electromagnet 3. In this case the spring means 4, for instance in the form of a tension spring, would have to be designed and located in such a way that they tend to hold the holding element 2 in a state, in which said holding element 2 does not act upon the arresting portion 12a of the drive shaft 12. The electromagnet 3 would in turn then have to interact with the holding element 2 or its actuating portion 21, such that upon energization it transfers the holding element 2 into a state, in which said holding element 2 arrests the actuator 1.

Presently, however, according to the illustrated exemplary embodiment, it will furthermore be proceeded on the assumption that the arresting appliance 2, 3, 4 is, upon energized electromagnet 3, in the deactivated state.

To now stop and arrest the actuator 1 it is, according to the present exemplary embodiment, merely required to interrupt the current flow to the electromagnet 3 (or in the above specified modification of the illustrated exemplary embodiment to establish a current flow to the electromagnet 3). Hereby, the electromagnet 3 in the illustrated exemplary embodiment no longer exerts magnetic holding forces on the holding element 2 or its actuating portion 21 so that the holding element 2 under the effect of the spring means 4 located between the casing 10 of the actuator 1 and the holding element 2, specifically its actuating portion 21, is lifted off from the electromagnet 3 along a direction determined by the spring force F or the spring moment, as illustrated in FIG. 3A. Hereby, the spring force F or the spring moment connected with it, exerted by the spring means 4, leads to a movement (pivoting movement S') of the holding element 2 (counter to the pivoting direction S previously determined by the magnetic holding forces M) by means of which the holding portion 22 of the holding element 2 is brought up against the arresting portion 12a of the drive shaft 12 along a return direction R to establish an engagement, compare FIG. 3A. This corresponds with a transition of the holding element 2 from a release position (FIGS. 2A to 2C), in which the actuator 1 is not arrested, into a holding position (FIGS. 3A to 3C), in which the actuator 1 is arrested by means of the holding element 2.

But even before the mechanical engagement is established (completely), first the current supply for the actuator 1 is interrupted, compare FIG. 3B, as consequence of the (pivoting) movement of the holding element 2 specified above, because the first electric connector 51 located on the holding element 2, specifically on its holding portion 22, comes out of contact with the allocated connection conductor element 53 which establishes the electrical contact between the connector 51 and the actuator 1, so that the electrical connection between the first electric connector 51 and the actuator 1 is interrupted, as can be seen with the help of FIG. 3B. In concrete terms, by the (pivoting) movement of the holding element 2 specified above, the connector portion 51a of the first electric connector 51 is lifted off from the allocated contacting portion 53A of the connection conductor element 53. So, immediately after the interruption of the current supply for the electromagnet 3 and a (pivoting) movement S' of the holding element 2 set off hereby, the current supply for the actuator 1 is interrupted.

Upon moving or specifically pivoting the holding element 2, after the interruption of the current supply for the electromagnet 3 and the return movement R of the holding portion 22 of the holding element 2 connected with it, the electroconductive surface 22b of the holding element 2, on top of that, comes in electrical contact with the short-circuit portions 52b, 53b of the second electric connector 52 and of the connection conductor element 53 allocated to the first electric connector 51 so that both poles of the motor are short-circuited along a schematically outlined short-circuit line K, as can likewise be seen with the help of FIG. 3B. (For this purpose the holding element 2 can be made of an electroconductive material or be furnished with an electric coat or another electrically conductive plane on the aforementioned surface 22b.)

As a result, a short-circuit brake of the actuator 1 is activated which in familiar manner decelerates the rotation of the drive shaft 12, compare EP 1 382 792 A1.

Consequently, the (pivoting) movement S' of the holding element 2 (as consequence of an interruption of the current supply for the electromagnet 3) out of the release position shown in FIGS. 2a to 2c (with deactivated arresting appliance) into a holding position therefore leads not only to an interruption of the current supply for the actuator 1 but also to a short-circuit braking of the actuator 1 or specifically of its drive shaft 12.

As particularly FIGS. 3A and 3C show, the (pivoting) movement S' of the holding element 2 furthermore leads the holding element 2 or its holding portion 22 to enter into (positive and/or force-fit locking) engagement with the arresting portion 12a of the drive shaft 12 by a return movement R, in that the (essentially U-shaped) wrap-around 22a of the holding portion 22, which encompasses the arresting portion 12a of the drive shaft 12, together with the fixing element 25 provided on said holding portion 22, acts jammingly (therefore essentially force-fit/friction lockingly) upon the arresting portion 12a. The fixing element 25 here encompasses the arresting portion 12a of the drive shaft 12 arc-shapedly (in the exemplary embodiment via an angle of a little less than 180°) so that a jamming effect of the fixing element 25 upon the arresting portion 12a of the drive shaft 12 is attained via the arc length.

The positive-locking locking component (on account of the arc-shaped configuration of the fixing element 25) presently only plays a considerably secondary role in comparison with the force-fit or friction locking component. For a positive locking engagement of the holding element 2 or the holding portion 22 with the arresting portion 12a of the drive shaft 12 the arresting portion 12a could for instance be provided with indentations with which protrusions on the side of the holding portion could engage.

Altogether, by the mechanical engagement of the arresting appliance 2, 3, 4, specifically of the holding element 2 or the holding portion 22 of the arresting appliance, with an arresting portion 12a of the actuator 1 it is attained that the actuator 1 or its drive shaft 12 (in static position) can reliably be arrested. This mechanical arresting is maintained so long until the electromagnet 3 is energized again so that the holding element 2 under the effect of the corresponding magnetic holding forces M again moves into the starting position (release position) shown in FIGS. 2A to 2C in which the arresting device 2, 3, 4 is deactivated. As already explained above, a return of the holding element 2 into the release position in which the arresting appliance 2, 3, 4 is deactivated can here basically also be initiated in another manner than by the energization of an electromagnet. Upon the return of the holding element 2 into the release position the short-circuit on the electric connectors 51, 52 (poles) of the actuator 1 is also cancelled as well as the electrical connection between the first electric connector 51 and the appertaining connection conductor element 53 is re-established, which is a prerequisite for the (renewed) electrical operation of the actuator 1.

As the holding element 2—via its holding portion 22 and the fixing element 25 there—, upon a (pivoting) movement S' out of the release position shown in FIGS. 2A to 2C, in which the arresting device 2, 3, 4 is deactivated, into its holding position, does not immediately fall into the arresting portion 12a (of the drive shaft 12), which is still moving rotarily at full speed (rotating), but instead rather a short-circuit braking is undertaken on the actuator 1 which immediately decelerates said arresting portion 12a, correspondingly smaller forces or moments act during the engagement of the holding element 2 with that said arresting portion 12a. This in turn makes possible correspondingly less expenditure and material requirements for the holding element 2 and particularly its fixing element 25.

The combination of a short-circuit braking of the actuator 1 of a superposition drive for a steering appliance of a motor vehicle and a mechanical fixing of the actuator 1 can also be realized independently of the layout of the actuator 1 along with the subordinate components of the superposition drive and the arresting appliance in the steering wheel of a motor vehicle. I.e., the combination of a short-circuit brake and a mechanical arresting appliance can even then be advantageously employed when the superposition drive lies for instance between a steering wheel and a steering shaft subordinate to the steering wheel, herein however provided as structural part separate from the steering wheel, or between two shaft portions of a steering shaft.

Furthermore, the arresting portion 12a which the arresting appliance 2, 3, 4 acts on for the mechanical arresting or locking of the superposition drive does not imperatively have to be a component of the actuator 1, and least of all it imperatively has to be a portion of its drive shaft 12. Rather, such an arresting appliance 2, 3, 4 can also act on an arresting portion of a gear element subordinate to the actuator 1 or the drive shaft 12, as a component of the superposition drive.

Subsequently, it will as an example be shown with the help of FIG. 4, how an actuator 1 of the kind that is illustrated in FIGS. 1 to 3C is to be installed in a steering wheel of a motor vehicle as part of a superposition drive along with the gear elements subordinate to the actuator 1 as well as along with the arresting appliance 2, 3, 4 of the drive.

Figure 4:
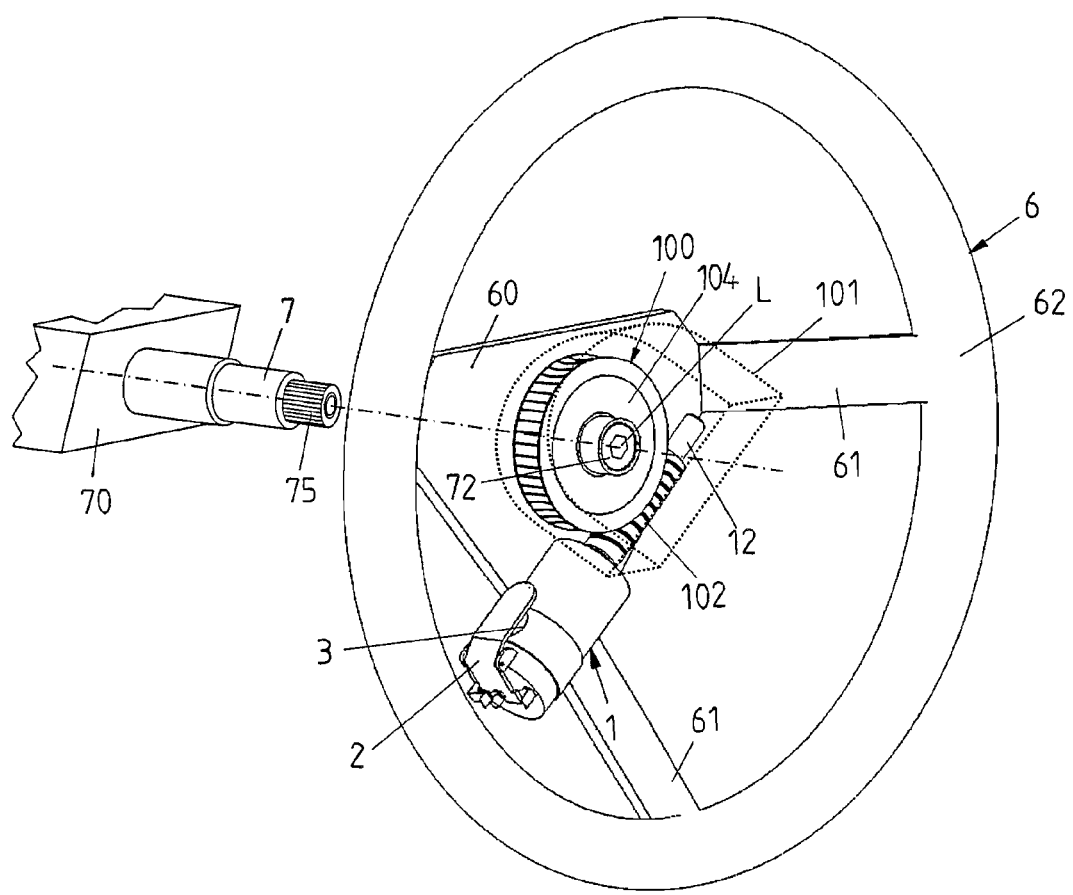
FIG. 4 shows a steering wheel for a motor vehicle with a superposition steering, comprising an actuator as well as a superposition gearing subordinate to the actuator and an arresting appliance allocated to the actuator, each one located on the steering wheel respectively.

In FIG. 4 a steering wheel 6 of a motor vehicle is illustrated which has a base area designated as steering wheel hub 60 as well as a steering wheel rim 62 connected with it by spokes 61. The steering wheel rim 62 serves for the rotating actuation of the steering wheel 6 by a driver, in that said driver grips the steering wheel 6 on the steering wheel rim 62 and rotates it around the steering axle L.

The base area of the steering wheel 6 designated as steering wheel hub 60 serves for connecting the steering wheel 6 to a steering shaft 7 (mounted in a motor vehicle e.g. in a steering column 70), which for this purpose is furnished with a connecting pin 75. In this way each rotation movement of the steering wheel 6 is converted into a rotation movement of the steering shaft 7 on a specific steering angle. The concrete connection of the steering wheel 6 to the steering shaft 7 will be specified more closely further below in connection with the superposition gearing 100.

Presently, a rotation movement of the steering shaft 7 is possible not only by (manual) actuation of the steering wheel 6 on the steering wheel rim 62 but also by actuation of a so-called superposition steering by means of an actuator 1 located on the steering wheel 6 of the kind that is illustrated in FIGS. 1 to 3C.

As part of a superposition drive 1, 100 the actuator 1—along with the allocated arresting appliance 2, 3, 4—is located on the steering wheel 6, that is specifically on a steering wheel spoke 61 in the area of its transition to the base of the steering wheel 6 designated as steering wheel hub 60.

The actuator 1, in this case in the form of a drive motor, drives (via a drive shaft 12) a subordinate superposition gearing 102, 104 which in the exemplary embodiment comprises a drive worm 102 being coupled with the drive shaft 12 of the actuator 1, that is to say mounted upon it, and a worm gear 104 being engaged with the drive worm 102. The latter worm gear 104 is mounted rotarily on the steering axle L of the steering wheel 6. Alternatively, the drive worm 102 can be a one-piece part of the drive shaft 12.

For housing the gear elements 102, 104 of the superposition gearing a gearbox casing 101, indicated with a dashed line in FIG. 4, is provided which in the exemplary embodiment is located on the base area of the steering wheel 6, namely on the steering wheel hub 60.

When operating the actuator 1, the worm 102, coupled with the actuator 1, is rotated and in turn hereby the worm gear 104 is driven, which said gear is coupled with the steering shaft 7, such that a rotation of the worm gear 104, initiated by the operation of the actuator 1, initiates a rotation movement of the steering shaft 7 relative to the steering wheel 6 on a specific superposed angle.

The rotation movement of the steering shaft 7 on a superposed angle, initiated by the superposition drive 1, 100, namely by the actuator 1 and the subordinate superposition gearing 100, is independent of a rotation movement of the steering shaft 7 on a specific steering angle initiated by manual actuation of the steering wheel 6 on the steering wheel rim 62. I.e., upon simultaneously actuating the steering shaft 7 on the one hand manually via the steering wheel rim 62 of the steering wheel 6 and on the other hand via the superposition drive 1, 100 it comes to a rotation movement of the steering shaft 7 on a resultant rotation angle that is composed of said steering angle and a superposed angle superposed with it.

A suitable connection of a steering wheel 6 to a steering shaft 7, particularly via a pin 75 appendant to the steering shaft 7 and an allocated sleeve or bushing on the steering wheel side, which permits an action of the steering wheel 6 upon the steering shaft 7 on the one hand by manually rotating the steering wheel 6 and on the other hand by the superposition drive 1, 100 on the steering wheel side is specified in WO 2007/009420 A1. In concrete terms, a sleeve on the steering wheel side grasps herein over the pin 75 on the steering shaft side and both are connected with each other by means of a fastening means, e.g. a screw 72, along the steering axle L. Full substantial reference to this document will be made regarding the connection of the steering wheel 6 to the steering shaft 7 (e.g. via a screw 72).

Presently, it can particularly be provided that the pin 75 of the steering shaft 7 is in torque-proof connection with the gear element (worm gear 104) of the superposition gearing 100 on the output drive side and fixed by suitable fastening means. The gear element on the output drive side in the form of a worm gear 104 as well as the further gear element in the form of a worm 102 which engages with said worm gear 104 are located in the gearbox casing 101. As the gearbox casing 101 is connected with the steering wheel 6 in its base area (steering wheel hub 60), upon a rotation of the steering wheel 6 around the steering axle L, particularly provoked by manual actuation of the steering wheel on the steering wheel rim 6, the steering shaft 7 can be co-rotated (on its longitudinal axis). On top of that, the superposition gearing 100—upon actuation by the actuator 1—can also act upon the steering shaft 7 to rotate said shaft, that is by action upon the steering shaft 7 via the gear element on the output drive side in the form of a worm gear 104.

The connection of the steering wheel 6 to the steering shaft 7 specified above particularly makes possible a relative movement, that is to say a relative turning, of the steering shaft 7 relating to the steering wheel 6. Hence, upon manual actuation of the steering wheel 6 the resultant rotation angle of the steering shaft 7 does not have to match the steering angle created by (manual) rotation of the steering wheel 6, but instead this steering angle can be superposed by a superposed angle created by an operation of the actuator 1 and the actuation of the superposition gearing 100 initiated hereby. (Unless the superposition drive 1, 100 is not active but rather arrested by means of the arresting appliance 2, 3, 4; then a rotation of the steering shaft 7 can exclusively take place by mechanical actuation of the steering wheel 6.) The connection between steering wheel 6 and steering shaft 7 therefore makes possible a rotation movement of the steering shaft 7 on a resultant rotation angle which—due to the superposition of a superposed angle created by the superposition drive 1, 100—does not have to match the steering angle created by manual actuation of the steering wheel 6, which corresponds with a relative turning of steering wheel 6 and steering shaft 7 towards each other, relating to the steering axle L.

As the superposition drive 1, 100, including the appertaining arresting appliance 2, 3, 4, presently is completely integrated into the steering wheel 6, and the steering wheel 6 in turn can be connected to common steering shafts 7 (separate from the steering wheel) with connecting pins 75, the provision of a superposition steering does not demand any special constructional adjustments of the steering system outside of the steering wheel 6. Merely the pin 75 on the steering shaft side and the allocated sleeve on the steering wheel side need to be adjusted to each other.

It is particularly not required to design the steering shaft 7 in multiple parts, as it is necessary with the superposition steerings that are integrated into the steering shaft. Furthermore, no special installation measures have to be carried out on the steering column surrounding the steering shaft 7—in contrast to such cases, in which a superposition steering provided on the steering shaft requires a configuration of the steering column that allows the integration of a superposition drive.

FIG. 5 shows a modification of the exemplary embodiment from FIGS. 1 to 4, that is in an overall illustration of a steering wheel, similar to FIG. 4, however, in a sectional view.

The steering wheel 6 illustrated in FIG. 5 corresponds in its basic structure with the steering wheel shown in FIG. 4. It consists of a steering wheel skeleton 6a and a coating 6b, for example in the form of a foam, and defines a steering wheel hub 60 as well as a steering wheel rim 62 being connected with each other via spokes 61.

In the central area of the steering wheel—with due installation in a motor vehicle above the steering wheel hub 60, seen from the perspective of a vehicle operator—an air bag module M is located which in familiar manner comprises, for the protection of a vehicle occupant that is to say in this case of the driver, an inflatable gas bag G, a gas generating appliance (inflator I) for inflating the gas bag G as well as a module covering A.

The steering wheel 6 serves for the actuation of a steering shaft 7 which extends in a steering column 70 (fixed to the vehicle body). The coupling of the steering wheel 6 with the steering shaft 7 under interposition of a superposition drive 1, 100 will subsequently be specified more closely, particularly regarding the differences in comparison with the exemplary embodiment of FIGS. 1 to 4.

First it should be mentioned that, for the supply of electric and/or electronic modules on the steering wheel side, which therefore can be rotated together with the steering wheel 6, a contact unit K is provided which as assembly on the side of the vehicle body comprises a stator S, located on the steering column 70, as assembly on the steering wheel side a rotor R, which can be rotated together with the steering wheel, as well as as electrical connection between these two assemblies a flexible conductor element in the form of a so-called coil spring W. A familiar contact unit with stator and rotor is shown in DE 197 27 856 A1 to which reference will be made regarding details of the possible structure and the function of a contact unit. Besides, an angle sensor (detector D) is provided to be able to register relative movements of the steering wheel 6 or the steering shaft 7 relating to a component fixed to the vehicle body.

Both the air bag module M and the contact unit K can in a corresponding manner also be provided on the steering wheel of FIG. 4; they were not illustrated in FIG. 4 merely for reasons of the lucidity of the perspective illustration there.

As is the case in the exemplary embodiment of FIGS. 1 to 4, a superposition drive 1, 100 is also allocated to the steering wheel 6 of FIG. 5 so that the steering shaft 7 allocated to the steering wheel 6 can be actuated both in the usual manner by actuating the steering wheel rim 6 and also (supplementary) by the superposition drive 1, 100, that is each one by creating a rotation movement of the steering shaft 7 on the steering axle L respectively. The superposition drive 100 comprises an actuator 1, for example in the form of an electric motor, and a superposition gearing 100 driven by the actuator, with a drive worm 102 that can be rotated by the actuator 1 and that is e.g.

located (torque-proof) on a drive shaft of the actuator 1 as well as with a worm gear 104 being engaged with the drive worm 102. The superposition gearing 100 is here located in a gearbox casing 101.

Regarding the location of the superposition drive 1, 100 on the steering wheel 6 there are the following two important differences in comparison with the embodiment of FIG. 4: For one, the actuator 1 of the superposition drive 1, 100 according to FIG. 5 is located (in the area of steering wheel spoke 61), such that its drive shaft or driving axle (principal axis H) extends inclined to the steering shaft 7 (steering axle L) of the steering wheel 6, that is essentially with the same inclination as the steering wheel spokes 61; but it does not extend vertically (at an angle of 90°) to the steering shaft 7, as provided in the exemplary embodiment of FIG. 4. For another, the essential parts of the superposition gearing 100, that is to say presently a drive worm 102 driven by the actuator 1 and the subordinate worm gear 104 in the exemplary embodiment of FIG. 5—seen from the perspective of a vehicle operator—, are located behind the steering wheel hub 60, while in the exemplary embodiment of FIG. 4 the corresponding components 102, 104 of the superposition gearing 100 are provided in front of the steering wheel hub 60.

A sleeve-like projection 106 is attached to the worm gear 104 of the superposition gearing 100, that is in the exemplary embodiment, concretely, on the inner side of the worm gear 104 (facing the steering shaft 7) (which said side is turned away from the outer side, interacting with the drive worm 102). The projection 106 extends sleeve-like along the steering shaft 7 and is mounted rotarily via suitable bearings 66, 67, for example in the form of rolling bearings, in this case a radial bearing 66 and an axial bearing 67 constructed as needle bearing, on a bearing pin 65 of the steering wheel hub 60. The bearing pin 65 is here designed and adjusted so that the worm gear 104 is located (via the projection 106 and the bearings 66, 67) rotarily around the steering axle L. The bearing pin 65 can here particularly be moulded into the steering wheel hub 60.

The sleeve-like projection 106 in turn can on the one hand be formed in one piece onto the worm gear 104 or constitute a separate part which in a suitable manner, for example by welding, shrinkage or moulding is connected with the worm gear 104.

The projection 106 is furthermore, by means of suitable fastening means 72, in this case in the form of a (central) screw, fixed torque-proof on to the steering shaft 7. As a result, the worm gear 104 is consequently—via the sleeve-shaped projection 106—secured (torque-proof) on the steering shaft 7. The sleeve-shaped projection 106 can for this purpose, in the area of the steering shaft 7, additionally have an internal toothing, interacting with an allocated external toothing of the steering shaft 7. As on the other hand the worm gear 104 (for example via the actuator 1 and the gearbox casing 101) is located on steering wheel 6 a connection of the steering wheel 6 altogether to the steering shaft 7 takes place at the same time also via the worm gear 104 and its sleeve-shaped projection 106. Such a connection is shown e.g. in DE 10 2005 034 636 A1.

The superposition gearing 100, particularly the drive worm 102 and the worm gear 104, are housed in a gearbox casing 101, indicated with a dotted line in FIG. 5, which can, via suitable fastening means 101*a*, for example in the form of screws, be secured on the steering wheel 6, particularly on the steering wheel hub 60. Moreover, on the gearbox casing 101, at least one further bearing area, for example in the form of an axial bearing (needle bearing 63), can be provided for the mounting of the worm gear 104 (via the sleeve-shaped projection 106). The gearbox casing 101 is open toward the steering wheel hub 60 so that the steering wheel hub 60 (along with the bearing pin 65) constitutes a casing cover for the gearbox casing 101.

A portion of the gearbox casing 101 facing the actuator 1 serves presently for the fastening of the actuator 1 on the gearbox casing 101 so that as a result this said casing 101 serves not only for the mounting of the superposition gearing 100, but additionally also for the support of the actuator. Alternatively, the actuator 1 can also be secured immediately on the steering wheel 6 or the steering wheel skeleton 6*a*.

An arresting appliance 8 is in turn allocated to the superposition drive 1, 100, which said appliance, in the exemplary embodiment of FIG. 5, has its own actuator/drive 80 (e.g. in the form of a linear motor, a relay or a pneumatic drive) as actuating means, a locking bolt 82 driven by said actuator/drive 80 as holding element and a locking plate 84 fixedly connected with the drive worm 102 (and rotating with said worm 102). The locking plate 84 comprises for example (in the area of its outer rim) recesses which in the exemplary embodiment should be spread along the circumference of the locking plate 84 and with which the locking bolt 82 can engage positive and/or force-fit lockingly to prevent the rotation of the locking plate 84 (and with that of the drive worm 102), that is with an (end-) portion serving as fixing means 82*a*. By actuating the actuator 80 (e.g. by interrupting the current supply in a linear motor/relay) the locking bolt 82 can be brought into engagement with the locking plate 84 for the fixation of the drive worm 102 of the superposition drive 1, 100, to arrest the superposition drive 1, 100. This can, for instance, take place by a longitudinal shift of the locking bolt 82, initiated by the actuator 80, wherein said bolt 82 can enter into engagement with the locking plate 84 or one of its recesses. FIG. 5 shows here the arrested state (locked state) of the arresting appliance 8 in which state the locking bolt 82 acts positive/force-fit lockingly upon the locking plate 84.

On the steering wheel, in this case covered by a foam casing 68 or covering 69, a control unit 9 (ECU) is furthermore located with electronic assemblies for controlling the actuators/drives 1, 8 and further electric/electronic modules which are in (torque-proof) connection with the steering wheel 6. On the vehicle side the delivery of current and electric signals to the control unit 9 takes place via the contact unit K which electrically connects the steering wheel 6 with the on-board electrical system and the central electronic system of a motor vehicle. In the exemplary embodiment of FIG. 5 the control unit 9 is positioned behind the steering wheel hub 60, is therefore turned away from a vehicle operator who duly actuates the steering wheel 6.

For the connection to the contact unit K, specifically to its rotor R, which can be rotated together with the steering wheel 6, a corresponding electric connecting link 95, for example in the form of a plug, is provided on the control unit 9. Coming from the control unit 9, electric current as well as electric signals can be transmitted to the individual electric components of the steering wheel 6, wherein in this case as an example only the electric connections 91, 92 with the two actuators 1, 80, that is to say the actuator 1 of the superposition drive 1, 100 and with the actuator 80 of the arresting appliance 8, are illustrated.

With the steering wheel 6 from FIG. 5 a steering movement can be initiated as follows by action upon the steering shaft 7:
On the one hand, the steering wheel 6 can be rotated in the usual manner by manual action upon the steering wheel rim 62 around the steering axle L, wherein this rotation movement is transmitted via the superposition drive, 1, 100 (which is configured self-lockingly), that is to say via its gearbox casing 101 on the input side and via its sleeve-shaped projection 106 on the output side, onto the steering shaft 7 so that a rotation movement of the steering wheel 6 leads to a corresponding rotation of the steering shaft 7.

On the other hand, a rotation movement of the steering shaft 7 on the steering axle L can also be initiated entirely independent of an actuation of the steering wheel 6 via the steering wheel rim 62 by the superposition drive 1, 100, in that its actuator 1 is activated and, via the drive worm 102 located on the drive shaft of the actuator 1, said actuator acts upon the worm gear 104 which in turn is connected with the steering shaft 7 via the sleeve-like projection 106 so that a rotation movement of the worm gear 104 around the steering axle L, initiated by an operation of the actuator 1, creates a corresponding rotation movement of the steering shaft 7.

The activation and deactivation of the actuator 1 of the superposition drive 1, 100 takes place by means of the control unit 9 and via the (direct) electrical connection 91 between the control unit 9 and the actuator 1. As opposed to the exemplary embodiment of FIGS. 1 to 4 no (mechanical or magnetic) forced coupling is provided between the means for interrupting the current supply (as well as for creating a short-circuit) for the deactivation of the actuator 1 of the superposition drive 1, 100 on the one hand and the appliance for arresting the superposition drive 1, 100 on the other. Rather, both functions are separately realized by controlling the (separate) actuators 1, 80. The means for deactivating the actuator 1 (by interrupting the current supply/creation of a short-circuit) are in this case in terms of circuitry designed and configured as components of the control unit 9 for instance as at least a thyristor.

The controlling of the superposition gearing 1, 100 on the one hand as well as the arresting appliance 8 on the other hand preferably takes place (by means of the control unit 9) in such a manner that, to stop a rotation movement of the steering shaft 7 created by the superposition drive 1, 100, first the actuator 1 is deactivated (by cutting off the current/creating a short-circuit via the connection 91) before thereupon an arresting takes place, in that the arresting appliance 8 is activated (via the allocated connection 92) by means of the control unit 9 (e.g. likewise by cutting off the current) and acts lockingly via the locking bolt 82, which can be actuated by the actuator 80 of the arresting appliance 8, and the subordinate locking plate 84 upon the drive worm 102 of the superposition drive 1, 100. As the actuator 1 of the superposition drive 1, 100 has already been decelerated electrically, that is to say by interrupting the current (and where applicable supplementary by short-circuit, as specified above with the help of FIGS. 1 to 4), when the arresting appliance 8 is activated to act upon the superposition drive 1, 100, specifically its drive worm 102, the mechanical load of the arresting appliance 8 is reduced correspondingly. The components 80, 82, 84 of the arresting appliance 8 can correspondingly be dimensioned smaller, which is advantageous given the limited free installation space available in the steering wheel 6.

The invention claimed is:

1. A steering wheel for a motor vehicle, having
   a steering wheel rim for rotating actuation of the steering wheel,
   a steering wheel hub for connecting the steering wheel to a steering shaft of a motor vehicle, said steering shaft being separate from the steering wheel, and
   a superposition drive for actuating a superposition steering by means of which said steering a steering angle created by actuating the steering wheel rim can be superposed by a superposed angle that can be created by the superposition steering so that a respective rotation movement of a steering shaft connected to the steering wheel is composed of a steering angle that can be created by actuating the steering wheel rim and a superposed angle that can be created by actuating the superposition steering,
   wherein an arresting appliance is provided on the steering wheel, separate from the components of the superposition steering for creating the superposed angle, by means of which the superposition drive can be arrested by mechanical action, wherein there is an interrupt mechanism by means of which prior to or upon activation of the arresting appliance, so that said arresting appliance arrests the superposition drive, the power supply, particularly the current supply, for the superposition drive is interrupted and wherein the interrupt mechanism has electric or electronic switching means for the interruption of the power supply for the superposition drive.

2. The steering wheel for a motor vehicle according to claim 1, wherein the superposition drive has an actuator and a superposition gearing subordinate to the actuator to create the superposed angle.

3. The steering wheel according to claim 2, wherein the torque-transmitting component of the superposition drive consists of a drive shaft of the actuator or an element connected with it.

4. The steering wheel according to claim 2 wherein the superposition gearing is located behind the steering wheel hub.

5. The steering wheel according to claim 1, wherein the arresting appliance is designed and provided for a positive and/or force-fit locking effect on a component of the superposition drive to block the superposition drive by mechanical action.

6. The steering wheel according to claim 5, wherein the arresting appliance comprises at least one holding element that in a holding position has a positive and/or force-fit locking effect on a component of the superposition drive to arrest said drive.

7. The steering wheel according to claim 6, wherein there is a movement-creating device by means of which the holding element can be moved back and forth between the holding position and a release position, in the latter of which the holding element releases the superposition drive to create a superposed angle.

8. The steering wheel according to claim 7 wherein the holding element is positioned in its release position in the deactivated state of the arresting appliance and in its holding position in the activated state of the arresting appliance.

9. The steering wheel according to claim 6 wherein at least one fixing element is provided on the holding element to act upon a component of the superposition drive to arrest said drive.

10. The steering wheel according to claim 9, wherein the fixing element is designed and provided for having a jamming and/or positive locking effect on the component of the superposition drive.

11. The steering wheel according to claim 6 wherein the holding element is mounted slidably or pivotably, to be able to move said element between a release position and a holding position.

12. The steering wheel according to claim 6 wherein the holding element is designed as a locking bolt that can be brought into engagement with a locking plate.

13. The steering wheel according to claim 1, wherein the arresting appliance for arresting the superposition drive can be brought into engagement with an arresting portion of a torque-transmitting component of the superposition drive.

14. The steering wheel according to claim 1, wherein a short-circuit brake is provided by means of which prior to or upon activation of the arresting appliance, so that said arresting appliance arrests the superposition drive, an electrically powered actuator of the superposition drive is decelerated by creating a short-circuit.

15. The steering wheel according to claim 1, wherein a movement-creating device by means of which the arresting appliance can be brought into its activated state, in which state said arresting appliance arrests the superposition drive, and into its deactivated state, comprises an actuator and a holding element that can be actuated by said actuator.

16. The steering wheel according to claim 15, wherein the arresting appliance, by energizing the actuator, can be brought into its deactivated state, in which state the actuator acts upon the holding element, such that the holding element takes its release position, and in that the arresting appliance, by interrupting the current supply for the actuator, can be brought into its activated state, in which state the holding element takes its holding position.

17. The steering wheel according to claim 1, wherein a control unit, located on the steering wheel for the control of the superposition drive, is located behind the steering wheel hub.

18. The steering wheel according claim 1, wherein the superposition drive has a driving axle which is inclined to the steering shaft.

19. A steering system for a motor vehicle, having a steering shaft and having a superposition drive for actuating a superposition steering having geared components by means of which said steering a steering angle created by manual actuation of the steering system, particularly via a steering wheel, can be superposed by a superposed angle created by the superposition steering, so that a respective rotation movement of the steering shaft is composed of a steering angle that can be created by manual actuation and a superposed angle that can be created by the superposition steering, wherein an arresting appliance is provided, separate from the geared components of the superposition steering for creating the superposed angle, by means of which the superposition drive can be arrested by mechanical action by shifting a non-geared component of the arresting appliance into engagement with a non-geared arresting portion of a torque-transmitting component of the superposition drive, and furthermore a short-circuit brake is provided, by means of which prior to or upon activation of the arresting appliance, so that said arresting appliance arrests the superposition drive, an electrically powered actuator of the superposition drive is decelerated by creating a short-circuit so that the torque-transmitting component including the non-geared arresting portion thereof begins decelerating prior to shifting of the non-geared arresting appliance component into engagement therewith.

20. The steering system according to claim 19, wherein the superposition drive has an actuator and a superposition gearing subordinate to the actuator to create the superposed angle.

* * * * *